(12) United States Patent
Kreutz

(10) Patent No.: US 6,521,840 B1
(45) Date of Patent: Feb. 18, 2003

(54) CABLE PENETRATION DEVICE

(75) Inventor: Tomas Kreutz, Lyckeby (SE)

(73) Assignee: Roxtec AB, Karlskorna (SE)

( * ) Notice: Subject to any disclaimer, the term of this patent is extended or adjusted under 35 U.S.C. 154(b) by 0 days.

(21) Appl. No.: 10/088,491

(22) PCT Filed: Oct. 5, 2000

(86) PCT No.: PCT/SE00/01924

§ 371 (c)(1),
(2), (4) Date: Mar. 26, 2002

(87) PCT Pub. No.: WO01/28057

PCT Pub. Date: Apr. 19, 2001

(30) Foreign Application Priority Data

Oct. 8, 1999 (SE) ................................................ 9903636

(51) Int. Cl.[7] .......................... H01B 17/26; H02G 15/00
(52) U.S. Cl. ................. 174/151; 174/65 SS; 174/77 R; 138/109; 277/603; 277/607; 277/627; 285/124.1; 285/152.1
(58) Field of Search ........................... 174/65 G, 65 SS, 174/77 R, 111, 151, 152 G; 138/96 R, 96 T, 109; 277/602, 603, 605–609, 626, 627; 285/124.1, 124.3, 152.1, 354

(56) References Cited

U.S. PATENT DOCUMENTS

| 2,941,025 A | * | 6/1960 | Wayman .................. 174/65 SS |
| 2,963,536 A | * | 12/1960 | Kokalas ................... 174/65 SS |
| 4,267,401 A | | 5/1981 | Wilkinson ................ 174/77 R |
| 5,235,138 A | | 8/1993 | Shah et al. .................. 174/151 |
| 5,442,140 A | * | 8/1995 | Mc Grane ................... 174/151 |
| 5,621,191 A | * | 4/1997 | Norris et al. ............. 174/65 SS |
| 5,691,505 A | * | 11/1997 | Norris ..................... 174/65 SS |
| 5,792,989 A | * | 8/1998 | Smith ........................ 174/77 R |
| 5,831,217 A | * | 11/1998 | Jarvis et al. ............... 174/153 R |
| 5,949,022 A | * | 9/1999 | Park et al. ................. 174/77 R |
| 6,034,325 A | * | 3/2000 | Nattel et al. ............ 174/65 SS |
| 6,039,324 A | * | 3/2000 | Santa, Jr. ...................... 174/92 |
| 6,118,076 A | * | 9/2000 | Damm et al. ............. 174/77 R |
| 6,409,179 B1 | * | 6/2002 | Daoud ........................ 277/602 |
| 6,441,305 B1 | * | 8/2002 | Dong ....................... 174/65 G |

FOREIGN PATENT DOCUMENTS

| DE | 41 33 025 | 4/1992 |
| DE | 298 03 091 | 6/1998 |
| GB | 2 280 317 | 1/1995 |
| SE | 460 392 | 10/1989 |

* cited by examiner

Primary Examiner—Dean A. Reichard
Assistant Examiner—Adolfo Nino
(74) Attorney, Agent, or Firm—Jacobson Holman PLLC

(57) ABSTRACT

A cable transit device, or cable penetration device, includes a tubular sleeve (1) that has means (11) at one end for fastening the device to a wall opening, and that has at its other end a thread (14) which interacts with a thread (53) on a nut (5). The nut includes a support shoulder (52) and the device includes a rubber sleeve which is located in the tubular sleeve (1) and has an outer diameter corresponding to the inner diameter of the tubular sleeve. The rubber sleeve is accommodated between the circular shoulder of the tubular sleeve and the support shoulder of the nut. The device also includes a plurality of module elements (4), each containing a cable accommodating channel (41) and each being divided to allow lateral access to the channel/channels. The modules (4) together fill-out the opening (31) of the rubber sleeve and have a shape that corresponds to the resultant outer contour of the mutually sealingly combined modules.

7 Claims, 1 Drawing Sheet

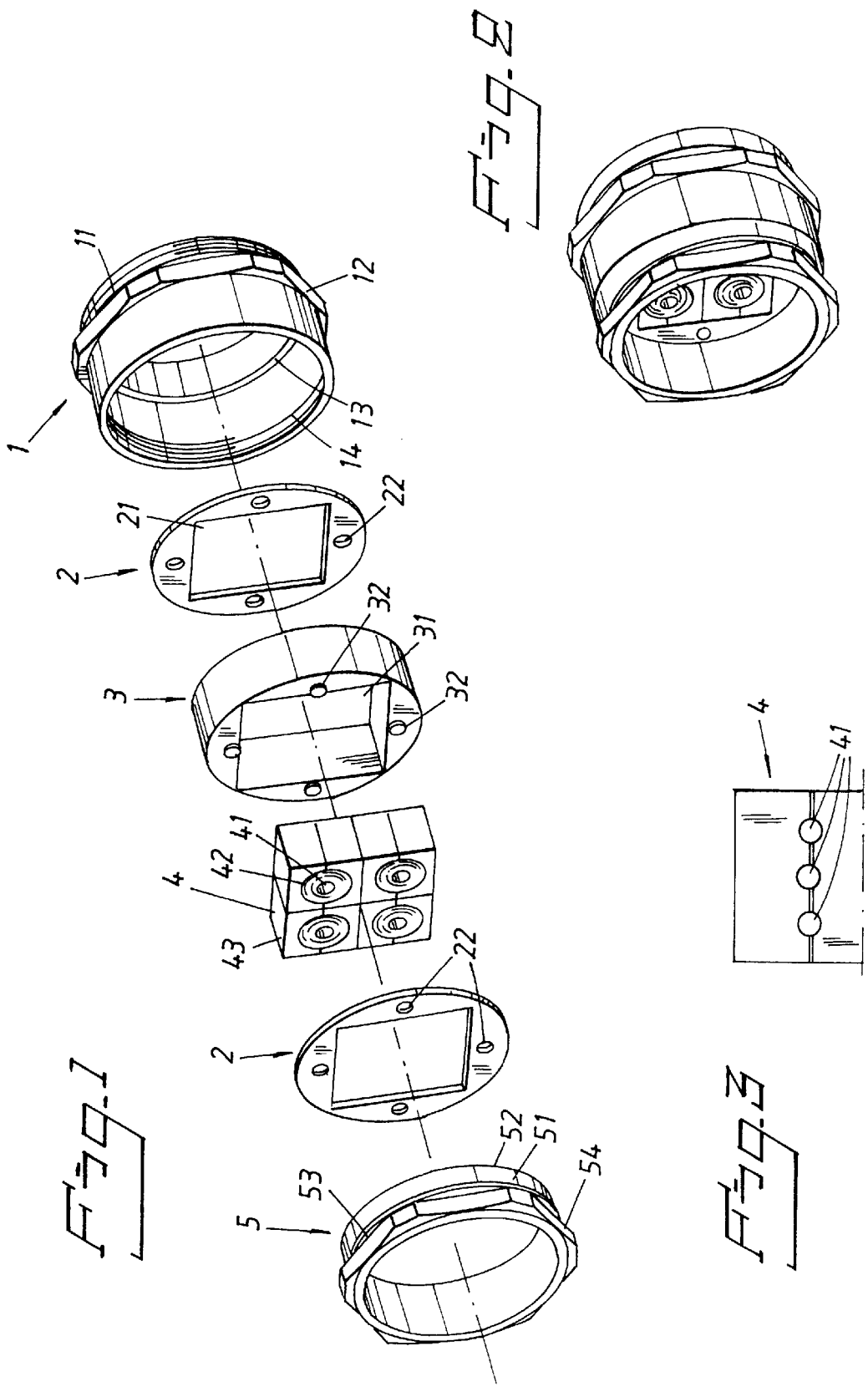

CABLE PENETRATION DEVICE

This is a nationalization of PCT/SE00/01924 filed Oct. 5, 2000 and published in English.

BACKGROUND OF THE INVENTION

1. Field of the Invention

The present invention relates to a cable penetration device.

2. Description of the Related Art

A cable penetration device, also called a cable transit device, that enables a plurality of cables to be fitted sealingly in an opening in the wall of a housing or some like structure is known, for instance, from U.S. Pat. Nos. 5,235,138, 4,267,401 or DE-U1-298 03 091, wherewith said device includes a rubber plug which has several through-penetrating channels that are plugged with removable stoppers and that are accessible from the circumferential edge of the plug via slits. A clamping plate is disposed on each side of the rubber plug and has openings corresponding to the channels. Tensioning bolts extend through the clamping plates and the rubber plug and function to cause the clamping plates to compress the rubber plug axially, therewith causing its channel walls to seal against cables that pass through the channels, and so that the plug circumference can be expanded into sealing contact with the wall opening of the cable transit device. The clamping plates must, of necessity, be rigid and takes-up a large part of the area of the wall opening. In addition, it is difficult to fit the cables correctly in practice, since the cables cannot be anchored sealingly in the device until the device is anchored sealingly in the transit opening.

A similar multi-cable transit device is known from SE-B-460 392.

A cable transit device that comprises a tubular sleeve at one end has an external thread for securing said device in a threaded opening through a wall or a housing, for instance a clutch housing, junction box or the like is known, for instance, from GB-A-22 80 317.

The tubular sleeve has at its other end a thread that co-acts with the thread of a nut. A rubber sleeve (gland) is disposed in the tubular sleeve between a circular shoulder on the nut and a circular shoulder in the tubular sleeve. The rubber sleeve is compressed axially by screwing in the nut thereby contracting the inner channel wall of the sleeve into sealing engagement around a cable that extends through the cable transit. The cable transit device is conventionally fitted to the housing and the cable is passed through said device and the ring-nut then tightened.

One problem with such cable transit devices is that they do not allow a pre-connected cable to be fitted easily, by pre-connected cable being meant a cable to which there has previously been connected to one end of a cable an electrical connector or contact that is larger than the bore of the rubber sleeve.

A further drawback is that the cable transit device only allows one single cable to be passed through.

SUMMARY OF THE INVENTION

An object of the present invention is to further develop a cable transit device of the aforesaid kind that will enable several cables, that may be pre-connected to an electrical device, to be passed through the device and secured sealingly at the same time on the one hand, and that can be pre-fitted in a wall opening and enable the cables to be sealingly fastened in a simple fashion on the other hand.

This object is achieved with a cable transit device including a tubular, elastic sleeve, and a plurality of elastic modules, each module containing at least one cable-accommodating, through-penetrating channel, with the modules together filling out an opening of the elastic sleeve, the opening having a shape that corresponds to the resultant outer contour of the mutually tightly combined modules. The device further includes a rigid sleeve having, at a first end portion, means for securing the rigid sleeve to a wall opening, the rigid sleeve having an inner circular shoulder against which the elastic sleeve is brought into abutment, and also having a thread at a second end portion. A nut that includes a support shoulder which co-acts with the elastic sleeve and that has a nut thread, interacts with the thread of the rigid sleeve, the nut having a cable-accommodating central opening. The rigid sleeve has an inner wall corresponding to an outer wall of the elastic sleeve, thereby enabling the cable transit device to be sealed by tightening the nut.

The sleeve is conveniently supported at each main surface by a support washer that includes an opening which is preferably slightly smaller than the sleeve orifice in the absence of load on said sleeve, so that the axial positional setting or retention of at least some of the modules between the support washers will be improved. Each module has a channel which is suitably filled initially, but which can be exposed. The modules are preferably divided, for instance in a plane axially to the channel, so as to enable the channel to be exposed by mutually separating the modules. The channel is normally plugged with a removable plug. The channel wall may be comprised of parallel layers of material that can be peeled away and therewith give the channel a selectively larger free diameter. The modules may, for instance, have a rectangular outer cross-sectional contour, for instance a square contour, and the sleeve opening may have a contour corresponding to the combined contour of a number of modules placed therein.

The sleeve and the washers will conveniently have mutually co-acting devices for maintaining the sleeve opening and the washer openings in correct alignment. These devices prevent relative rotation between the sleeve and respective washers. For instance, the washers may be provided with holes that receive projections on the axial ends of the sleeve to this end.

In one embodiment of the invention, the cable transit device may include four modules of square cross-section that together essentially fill the corresponding square opening through the rubber sleeve.

Respective modules may be divided in two parts in a plane axially to their throughpassing channels. The channel wall may consist of a tubular elastomeric element built-up of concentric layers which have a relatively low bonding strength in relation to each other, so as to enable the layers to be peeled one from the other and therewith adapt the size of the channel to the size of the cable concerned. The tubular rubber element that defines the channel through the module may be supported by a surrounding module part, which may also be elastically resilient, springy, so that the radially directed compression force from the rubber sleeve can be passed to its tubular sleeve and to the cable circumference via the module body.

BRIEF DESCRIPTION OF THE DRAWINGS

An inventive cable transit device will now be described with reference to an exemplifying embodiment thereof and also with reference to the accompanying drawing.

FIG. 1 is an expanded perspective view illustrating schematically an inventive cable transit device.

FIG. 2 illustrates schematically the device in an assembled state.

FIG. 3 is a schematic illustration of one variant of a module.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The device shown in FIG. 1 includes a rigid tightening sleeve 1 which has at one end an so external thread 11 for engagement with a corresponding thread in an opening in, for instance, a wall of a coupling housing or junction box (not shown). The sleeve also includes an outer spanner grip 12. Provided on the inside of the sleeve is a circular shoulder 13, and an internal thread 14 at its end distal from the thread 11. A nut 5 includes a support ring 51 which is received in the sleeve 1 with a slight radial clearance, and has an end 52 which forms a further support shoulder 52. The nut also includes an external thread 53 which interacts with the internal thread 14 of said sleeve, and a spanner grip 54. A rubber compression sleeve 3 has an outer diameter that corresponds to the inner diameter of the sleeve 1 between the shoulders 13, 52. The rubber sleeve 3 has a rectangular, axially throughpassing opening 31 and axially extending projections 32 on each end surface. Lying on each side of the rubber sleeve 3 is a washer 2 whose outer diameter corresponds to the inner diameter of the sleeve 1 between the shoulders 13, 52. Respective washers 2 include a square opening 21 that is slightly smaller than the opening 31, and also include holes 22 that have a size and position that enables them to receive the projections 32 and thereby impart a correct position of rotation of said washers 2 in relation to the sleeve 3, so that their openings 21, 30 will be aligned congruently.

Four modules 4 are mounted in the sleeve opening 31. Each module 4 has a central, axially extending channel 41, which can be fitted with a removable stopper (not shown). The channel 41 may be defined by a tubular element 42 that consists of mutually concentric layers that have limited adhesion to one another, so that said layers can be peeled-off such as to establish a chosen channel diameter. The tubular element 42 may consist of elastic material. The module 4 may comprise an outer module body 43 that receives the element 42. The module body 43 may be elastomeric.

As the nut 5 is screwed into the sleeve 1, the sleeve 3 is compressed axially and therewith transfers the radially acting compression forces to the circumference of a cable extending through respective channels 41, via the modules and the elements 42. The spanner grip 54 may be arranged to co-act with the sleeve 11 in a manner to limit or restrict compression of the rubber sleeve 3.

When using the device illustrated in FIG. 2, the device is first fitted in an opening in a coupling housing (not shown), with the exception of the modules 4. Cables are then drawn through the device. Modules 4 of appropriate channel size are then mounted on the cables and caused to fill out the opening 31 in the rubber sleeve 3. The nut 5 is then tightened and the shoulders 13, 52 therewith transfer force to the washers 2 and further to the ends of the rubber sleeve 3, such as to contract the sleeve opening 31 and compress the modules 4 and therewith achieve sealed transit of the cables passing therethrough and anchoring said cables against pulling forces.

The illustrated modules have a square cross-section and a partition plane that extends parallel to two module sides.

A module may include two or more, preferably parallel, channels 41 that lie suitably in the module partition surface, as illustrated in FIG. 3.

The inner wall of the sleeve 1 and the outer wall of the sleeve 3 are suitably adapted to fit together at the centre, and may be cylindrical in shape.

After the cable bunch has been sealingly fixated in the cable transit device, the electrical contacts pre-fitted to the cables can be connected easily and reliably to respective corresponding electric contacts in the coupling housing.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A cable transit device comprising:
    a tubular, elastic sleeve;
    a plurality of elastic modules, each containing at least one cable-accommodating, through-penetrating channel, said modules together filling out an opening of the elastic sleeve, said opening having a shape that corresponds to the resultant outer contour of the mutually tightly combined modules,
    a rigid sleeve which includes, at a first end portion, means for securing the rigid sleeve to a wall opening, said rigid sleeve having an inner circular shoulder against which the elastic sleeve is brought into abutment, said rigid sleeve having a thread at a second end portion;
    a nut that includes a support shoulder which co-acts with the elastic sleeve and that has a nut thread which interacts with the thread of the rigid sleeve, said nut having a cable-accommodating central opening; and
    said rigid sleeve having an inner wall corresponding to an outer wall of the elastic sleeve, thereby enabling the cable transit device to be sealed by tightening the nut.

2. The device according to claim 1, further including a support washer mounted on each end surface of the elastic sleeve, each support washer having an opening that corresponds to the opening of the elastic sleeve, wherein the support washers are adapted to transfer force from the shoulder of the rigid sleeve to the elastic sleeve and from the nut support shoulder to the sleeve, respectively.

3. The device according to claim 2, wherein each support washer has at least one hole that receives a corresponding projection on the end surface of the elastic sleeve, so as to keep the opening of said washer in congruent alignment with the opening of the elastic sleeve.

4. The device according to claim 1, wherein the modules are divided in a, plane axial to the channel, said channel being established with a tubular element that includes mutually concentric layers that can be separated from each other to enable a diameter of the channel to be adapted to a diameter of a cable to be received therein, said tubular element being received in a channel body that defines a cross-sectional shape of the module and that transfers forces from the elastic sleeve to said tubular element.

5. The device according to claim 1, wherein the modules include several generally parallel channels that lie in a module partition plane axial to said channels.

6. The device according to claim 5, wherein the channels are provided with removable sealing elements.

7. The device according to claim 1, wherein the modules have rectangular cross-sections and a partition plane that is generally parallel with and located centrally between two mutually opposing, parallel outer module surfaces.

* * * * *